(12) United States Patent
Lovelace

(10) Patent No.: US 11,646,461 B2
(45) Date of Patent: May 9, 2023

(54) BATTERY COOLING SYSTEMS AND METHODS

(71) Applicant: Aurora Flight Sciences Corporation, Manassas, VA (US)

(72) Inventor: Edward C. Lovelace, Arlington, MA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 16/821,911

(22) Filed: Mar. 17, 2020

(65) Prior Publication Data
US 2021/0296715 A1    Sep. 23, 2021

(51) Int. Cl.
| | | |
|---|---|---|
| *H01M 10/613* | (2014.01) | |
| *H01M 10/625* | (2014.01) | |
| *H01M 10/6555* | (2014.01) | |
| *H01M 10/6551* | (2014.01) | |
| *H01M 10/653* | (2014.01) | |

(Continued)

(52) U.S. Cl.
CPC ......... *H01M 10/613* (2015.04); *B64C 39/024* (2013.01); *H01M 10/625* (2015.04); *H01M 10/653* (2015.04); *H01M 10/6551* (2015.04); *H01M 10/6555* (2015.04);
(Continued)

(58) Field of Classification Search
CPC ............. H01M 10/613; H01M 10/625; H01M 10/653; H01M 10/6551; H01M 10/6555; H01M 50/20; H01M 2220/20; H01M 10/6557; H01M 10/6563; H01M 10/647; H01M 10/63; H01M 10/643; H01M 10/6554; H01M 10/6556; H01M 10/6567; B64C 39/024; B64C 2201/042; Y02E 60/10
See application file for complete search history.

(56) References Cited

U.S. PATENT DOCUMENTS 9,159,982 B2 * 10/2015 Wood ................ H01M 10/6566
10,559,792 B1 * 2/2020 Combs .................. B64D 41/00
(Continued)

FOREIGN PATENT DOCUMENTS

CN      1881658 A  * 12/2006  ........ H01M 10/0413
CN    102593549 A  *  7/2012  ......... B60H 1/00278
(Continued)

OTHER PUBLICATIONS

Extended European Search Report dated Aug. 11, 2021 from corresponding EP Application No. 21161241.1, 6 pages.
(Continued)

*Primary Examiner* — Kaity V Chandler
(74) *Attorney, Agent, or Firm* — Haynes and Boone, LLP

(57) ABSTRACT

A battery cooling system is described, including a thermally conductive cooling plate having a first surface and a second surface opposite the first surface. A first group of battery cells may be disposed on the first surface of the cooling plate, a second group of battery cells may be disposed on the second surface of the cooling plate, and a thermally conductive interstitial layer may be coupled between the cooling plate and the first group of battery cells, and between the cooling plate and the second group of battery cells. The cooling plate is configured to draw heat from the first group and the second group of the battery cells.

20 Claims, 10 Drawing Sheets

(51) Int. Cl.
*H01M 50/20* (2021.01)
*B64C 39/02* (2023.01)

(52) U.S. Cl.
CPC ....... *H01M 50/20* (2021.01); *B64C 2201/042* (2013.01); *H01M 2220/20* (2013.01)

(56) References Cited

U.S. PATENT DOCUMENTS

| | | | | |
|---|---|---|---|---|
| 2012/0045682 | A1* | 2/2012 | Oury | H01M 10/0585 429/120 |
| 2012/0153901 | A1* | 6/2012 | Hermann | H01M 10/6553 320/135 |
| 2012/0164497 | A1* | 6/2012 | Saito | H01M 50/449 429/61 |
| 2012/0308848 | A1* | 12/2012 | Miyamae | H01M 50/284 429/7 |
| 2014/0322582 | A1* | 10/2014 | Ruter | H01M 50/20 429/177 |
| 2016/0204464 | A1* | 7/2016 | Cho | H01M 10/0459 29/623.5 |
| 2017/0229748 | A1* | 8/2017 | Rawlinson | H01M 50/204 |
| 2017/0237116 | A1* | 8/2017 | Shindo | H01M 50/136 429/127 |
| 2017/0324125 | A1* | 11/2017 | Schoenherr | H01M 50/548 |
| 2019/0103640 | A1* | 4/2019 | Takabayashi | H01M 10/6554 |
| 2019/0296313 | A1* | 9/2019 | Kato | H01M 50/176 |
| 2019/0296321 | A1* | 9/2019 | Newman | H01M 50/213 |
| 2019/0296407 | A1* | 9/2019 | Newman | H01M 10/6551 |
| 2019/0305395 | A1* | 10/2019 | Favaretto | H01M 10/613 |
| 2019/0319249 | A1* | 10/2019 | Barton | H01M 50/502 |

FOREIGN PATENT DOCUMENTS

| | | | | |
|---|---|---|---|---|
| CN | 202363528 U | * | 8/2012 | ............ H01M 10/04 |
| CN | 102714288 A | * | 10/2012 | ......... H01M 10/425 |
| CN | 105531846 A | * | 4/2016 | .......... H01M 2/1077 |
| CN | 206022543 U | * | 3/2017 | ............ H01M 10/04 |
| CN | 106784496 A | * | 5/2017 | ......... H01M 10/613 |
| CN | 107046144 A | * | 8/2017 | ............ H01M 10/04 |
| CN | 206758568 U | * | 12/2017 | ............ H01M 10/04 |
| CN | 107615567 A | * | 1/2018 | ....... H01M 10/0481 |
| CN | 107834131 A | * | 3/2018 | ......... H01M 10/613 |
| EP | 2544258 A1 | | 1/2013 | |
| EP | 3176851 A1 | | 6/2017 | |
| EP | 3525257 A1 | | 8/2019 | |
| WO | WO 2017/107170 A1 | | 6/2017 | |
| WO | WO-2020028931 A1 | * | 2/2020 | ....... H01M 10/0422 |

OTHER PUBLICATIONS

Zaversky et al.: "Continued Glimpses into xEV Batteries on the Market", AABC San Diego 2019: Safety in AVL Series Battery Benchmark program, 24 pages.

* cited by examiner

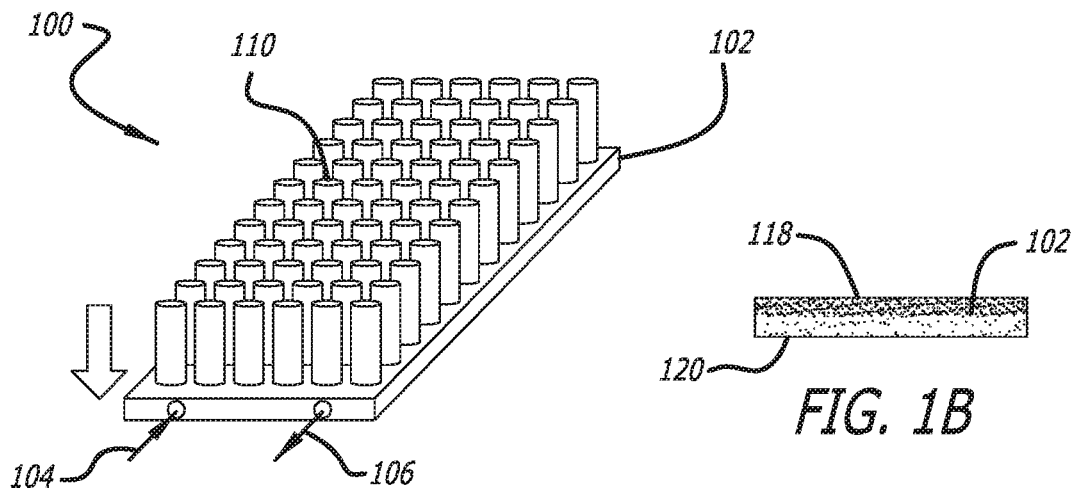
FIG. 1A
FIG. 1B
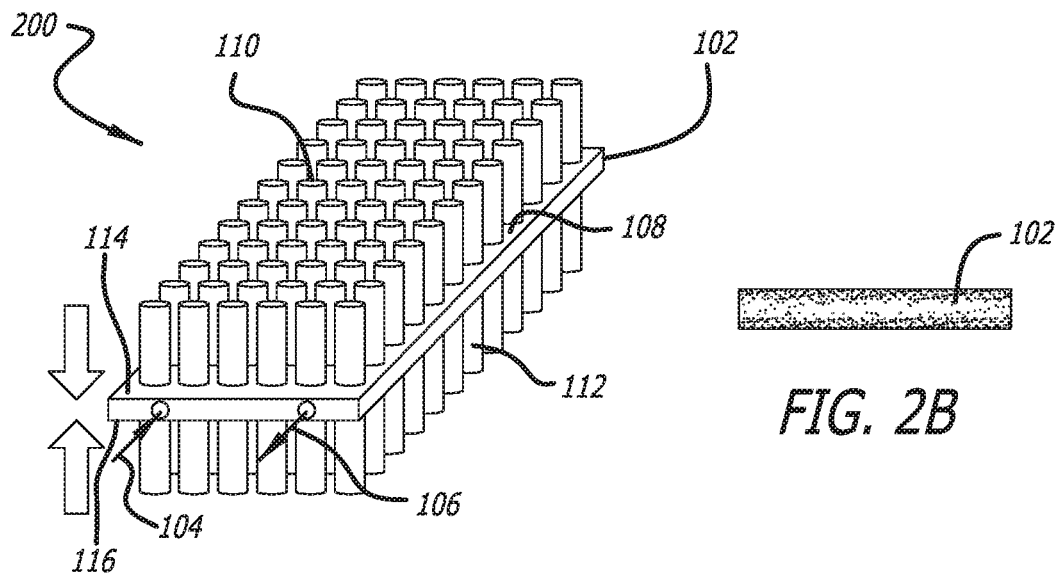
FIG. 2A
FIG. 2B

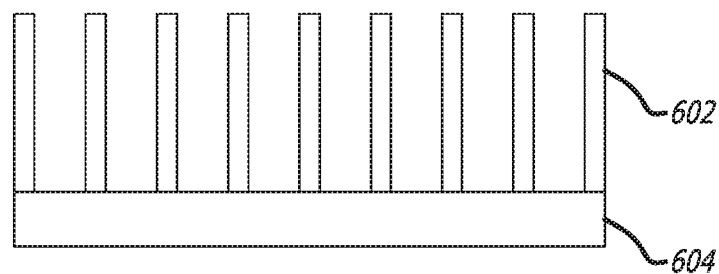
FIG. 5
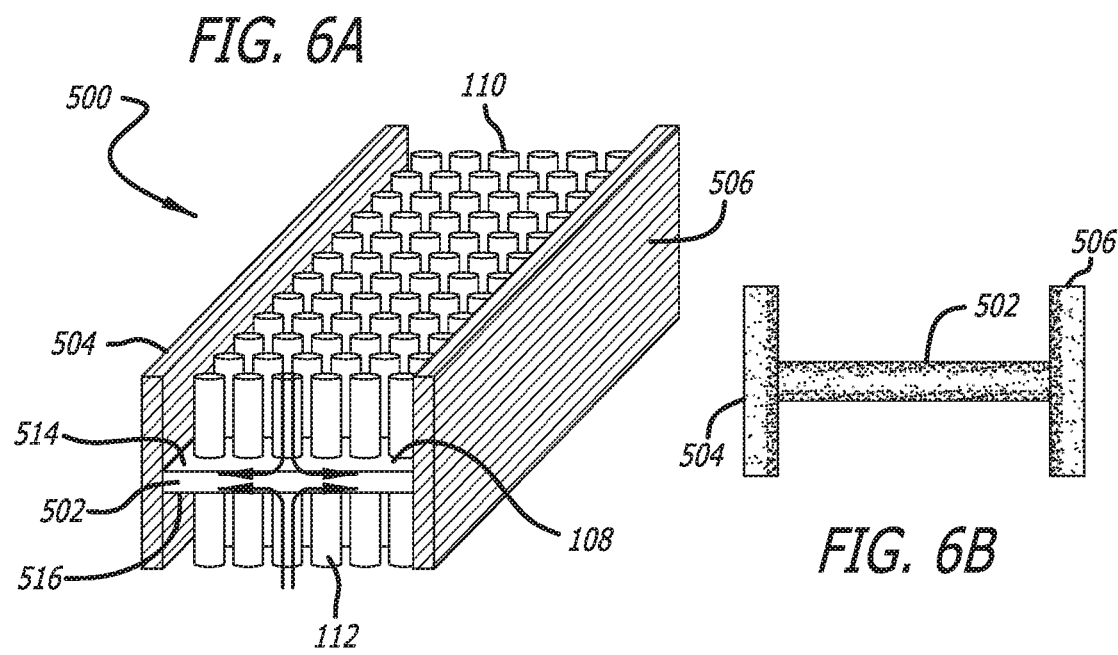
FIG. 6A
FIG. 6B

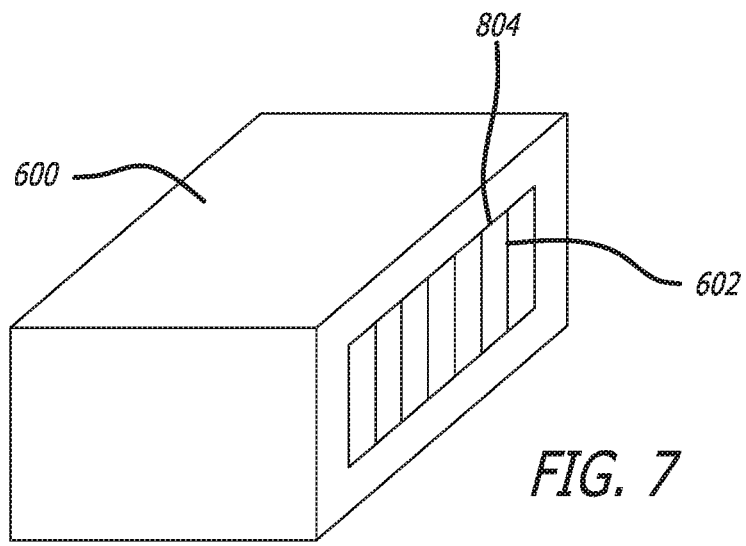
FIG. 7
FIG. 8A
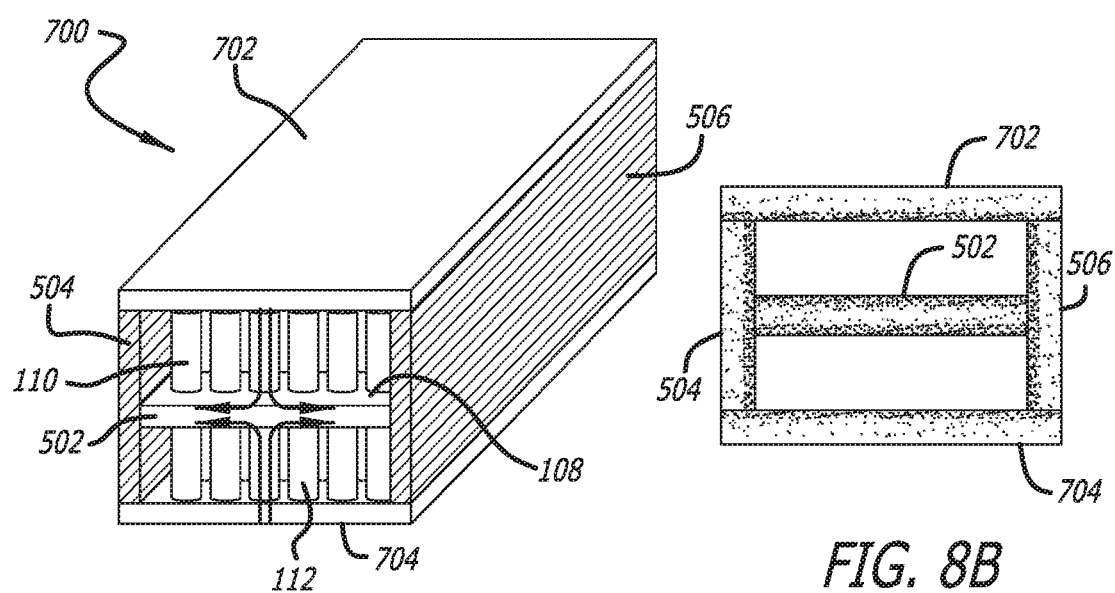
FIG. 8B

BATTERY COOLING SYSTEMS AND METHODS

TECHNICAL FIELD

The present application generally relates to cooling techniques of batteries. More particularly, it relates to battery cooling systems and methods.

BACKGROUND

Rechargeable battery packs may be disposed on heat sinks to remove heat from the battery cells. Certain conventional techniques include disposing the battery cells on a plate that has heat removing characteristics and capabilities. When such rechargeable batteries are used in vehicles and aircrafts, consideration must be given to space and weight limitations. For example, the weight of the battery packs is a significant concern in aircrafts, such as in unmanned aerial vehicles (UAVs). Even when the battery packs are used in ground vehicles, space and weight is also a concern because they adversely affect the performance of the vehicles.

SUMMARY

Various battery cooling systems and methods are described. According to an example, a batter cooling system is described, including: a thermally conductive cooling plate having a first surface and a second surface opposite the first surface; a first group of battery cells disposed on the first surface of the cooling plate; a second group of battery cells disposed on the second surface of the cooling plate; a thermally conductive interstitial layer coupled between the cooling plate and the first group of battery cells, and between the cooling plate and the second group of battery cells; wherein the cooling plate is configured to draw heat from the first group and the second group of the battery cells.

According to another example, a method for cooling a battery system is described. The method may include: a thermally conductive cooling plate including a heat exchanger, a first surface, and a second surface opposite the first surface; a first group of battery cells disposed on the first surface of the cooling plate; a second group of battery cells disposed on the second surface of the cooling plate; a thermally conductive interstitial layer coupled between the cooling plate and the first group of battery cells, and between the cooling plate and the second group of battery cells; wherein the method includes: drawing heat, by the cooling plate, from the first group and the second group of battery cells; and removing, via the heat exchanger, the heat from the cooling plate.

According to another example, a battery cooling system is described, including: a thermally conductive frame including a cooling plate, a first side wall, and a second side wall; a first group of battery cells disposed on a first surface of the cooling plate; a second group of battery cells disposed on a second surface of the cooling plate opposite the first surface; a thermally conductive interstitial layer coupled between the first surface of the cooling plate and the first group of battery cells, and between the second surface of the cooling plate and the second group of battery cells; wherein the cooling plate is configured to draw heat from the first group and the second group of the battery cells and transfer the drawn heat to the first and second side walls configured to dissipate the heat into air.

The scope of the invention is defined by the claims, which are incorporated into this section by reference. A more complete understanding of examples of the invention will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

FIGS. 1A-1B is an example illustration of a conventional battery cooling system and a corresponding thermal gradient of the cooling plate.

FIGS. 2A-2B is an example illustration of a battery cooling system and a corresponding thermal gradient of the cooling plate, according to an example of the present disclosure.

FIG. 5 is an example illustration of a close-up view of the cooling plate with cooling fins thereon, according to an example of the present disclosure.

FIGS. 6A-6B is an example illustration of a battery cooling system and a corresponding thermal gradient of the cooling plate, according to an example of the present disclosure.

FIG. 7 is an illustration of an example battery container with the battery cooling system exposed from the battery container, according to an example of the present disclosure.

FIGS. 8A-8B is an example illustration of a battery cooling system and a corresponding thermal gradient of the cooling plate, according to an example of the present disclosure.

Figure 3A:
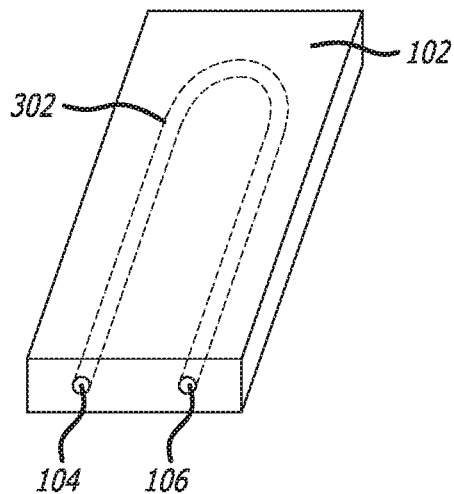
FIGS. 3A-3B is an example illustration of cooling coils of a cooling plate, according to various examples of the present disclosure.

Examples of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, examples will be described in more detail with reference to the accompanying drawings. The present invention, however, may be embodied in various different forms, and should not be construed as being limited to only the illustrated examples herein. Rather, these examples are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

One way to reduce space usage and weight from battery systems in space and weight limited situations is to more effectively use the available cooling systems so that the same cooling effect may be achieved by using the already existing equipment without introducing any additional equipment. FIG. 1A is an example of a battery cooling system 100 according to conventional techniques. In this system, the battery cells 110 are disposed on a cooling plate 102 that acts as a heat sink for the battery cells 110 as they generate heat. The battery cells 110 may be rechargeable batteries known to those skilled in the art, such as, lithium ion batteries, nickel cadmium batteries, and/or nickel metal hybrid batteries, and they may come in different sizes and shapes. The battery cells 110 may generate heat during discharging operations (e.g., when the batteries are used to power a device or a system) and/or during charging operations, which can degrade battery life and potentially cause the batteries to leak and/or explode thereby posing a danger to personnel or damage to equipment. Thus, the cooling plate 102 acting as a heat sink draws the heat away from the battery cells 110, thereby lowering the temperature of the battery cells 110.

FIG. 1B illustrates an example thermal gradient of the conventional cooling plate 102 where the battery cells 110 are relatively hot and the cooling plate 102 is drawing the heat away from the battery cells 110. Thus, the top surface 118 of the cooling plate 102 is the hottest and the temperature becomes cooler towards the other surface 120 of the cooling plate 102.

FIG. 2A is an example of a battery cooling system 200 according to an example of the present disclosure. As illustrated, a first group of battery cells 110 are disposed on a first surface 114 of the cooling plate 102 and a second group of battery cells 112 are disposed on a second surface 116 of the cooling plate 102 opposite the first surface 114. That is, the first surface 114 and the second surface 116 face away from each other in opposite directions. In some examples, the first and second groups of battery cells 110, 112 may be electrically coupled in series or in parallel based on the requirements of the application. The cooling plate 102 may be configured to cool the battery cells on both the first surface 114 and the second surface 116, thus increasing the surface area of the cooling plate 102 that is used for cooling. In this manner, a single cooling plate 102 is able to draw heat away from two groups of battery cells 110, 112, thereby reducing the number of cooling plates 102 that are needed relative to conventional techniques that use only one surface.

In some examples, the cooling plate 102 may comprise a fluid (e.g., liquid) cooled heat exchanger coupled to or embedded within the cooling plate 102. For example, the cooling plate 102 may include an input port 104 for the coolant to enter the cooling coils of the cooling plate 102 and an output port 106 for the coolant to exit from the cooling plate 102.

In some examples, the battery cells 110, 112 may be coupled directly to the cooling plate 102, thereby allowing the heat to transfer directly from the battery cells to the cooling plate 102. In other examples, a thermally conductive interstitial layer 108 may be provided between each of the battery cells 110, 112 and the cooling plate 102 to thermally couple the battery cells 110, 112 to the cooling plate 102. In some examples, the thermally conductive interstitial layer 108 may actually improve the thermal contact between the battery cells 110, 112 and the cooling plate 102, thereby increasing the heat transfer rate from the battery cells 110, 112 to the cooling plate 102. The interstitial layer may be made of substantially thin sheets or layers of a thermally conductive material. In some examples, the interstitial layer may be a thermally conductive mounting bracket or a coupling to assist with mounting the battery cells 110, 112 to the cooling plate 102 to prevent the battery cells 110 from moving off of the cooling plate 102.

FIG. 2B illustrates an example thermal gradient of the cooling plate 102 according to the example illustrated in FIG. 2A. Differently from FIG. 1A, the cooling plate 102 according to this example has battery cells 110, 112 disposed on both the first and second surfaces 114, 116 of the cooling plate 102. Therefore, the thermal gradient shows that both the top and bottom surfaces 122, 124 of the cooling plate 102 are warmer than the center portion of the cooling plate 102 because the cooling plate 102 draws heat through the first surface 114 and the second surface 116.

Figure 3B:
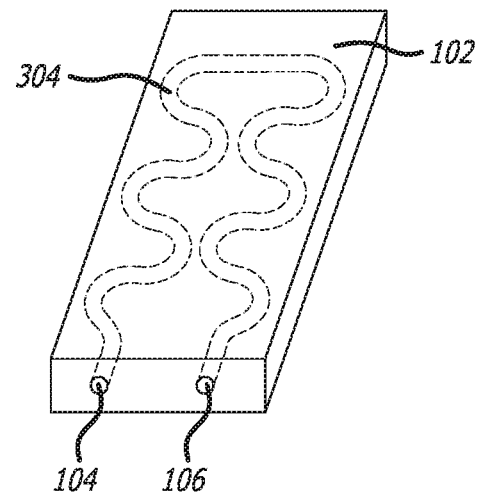

FIGS. 3A-3B are examples of cooling coil arrangements of a liquid cool heat exchanged embedded in the cooling plate 102 according to various examples of the present disclosure. The coolant coil 302 illustrated in FIG. 3A includes a U-shaped coolant coil 302 that has a coolant input port 104 and a coolant output port 106. The coolant input port 104 and the coolant output port 106 may be coupled to a coolant pump (not illustrated) to pump create pressure within the cooling coil and circulate the coolant through the coolant coils 302. In this manner, the coolant in the coolant coil 302 draws the heat away from the battery cells 110, 112 thus increasing the temperature of the coolant. The coolant then flows out of the coolant output port 106 from the pump pressure. In some examples, the coolant output port 106 may be coupled to a coolant condenser (not illustrated) to remove the heat from the coolant, thereby reducing the temperature of the coolant so that it can be pumped back in to the coolant coil 302 continue the cycle of removing heat from the battery cells 110, 112. In some examples, the flow rate of the coolant may be increased or decreased by adjusting the speed of the coolant pump to affect the rate of heat removal from the battery cells 110, 112. For example, running the coolant pump at a higher speed will increase the coolant flow through the coolant coil 302 and thus removing more heat. On the other hand, lowering the pump speed will remove less heat. Thus, when two groups of battery cells 110, 112 are disposed on the two surfaces of the cooling plate 102, the flow rate of the coolant should be increased.

FIG. 3B illustrates another example of an arrangement of the cooling coil, according to an example. For example, the coolant coil 304 may include a plurality of twists and turns within the cooling plate 102, thereby covering a great area of the cooling plate 102. Thus, a greater volume of the coolant is able to flow within the cooling plate 102 through a longer coolant coil 304 which, in turn, increases heat removal (e.g., cooling effect) from the battery cells 110, 112. It should be noted that a person having ordinary skill in the art would understand that the cooling coil may be arranged in many different forms.

Figure 4A:
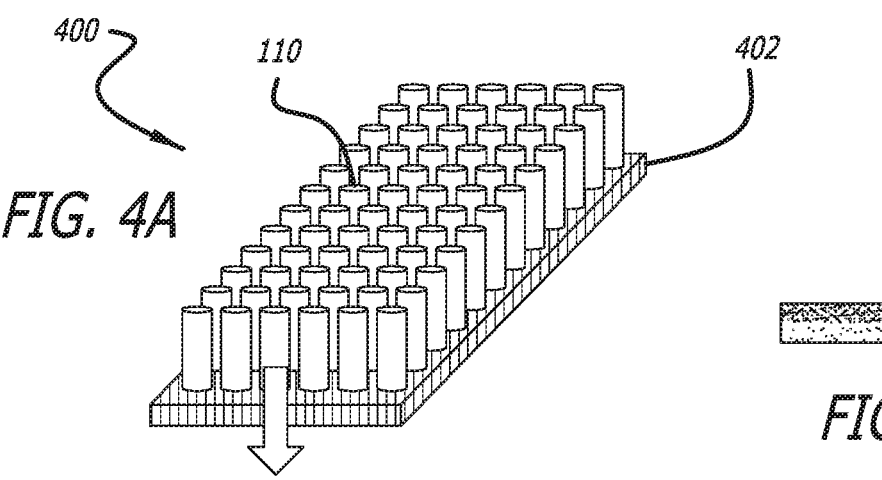
FIGS. 4A-4B is an example illustration of a battery cooling system and a corresponding thermal gradient of the cooling plate, according to an example of the present disclosure.

FIG. 4A is an example of another convention battery cooling system 400 where the battery cell 110 are disposed on just one surface of the cooling plate 402. According to this conventional technique, the cooling plate 402 acts as a heat sink by dissipating heat in to the environment through heat sink fins 602. A close-up view of example heat sink fins 602 are illustrated in FIG. 5. As illustrated, a plurality of fins 602 may be coupled to a base plate 604 (e.g., the cooling plate 402). Thus, as the cooling plate 402 of FIG. 4A draws heat from the battery cells 110, the heat is then drawn toward the fins 602, which are exposed to the environment and dissipates the heat in to the air.

Figure 4B:
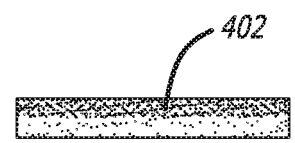

FIG. 4B illustrates a thermal gradient of the cooling plate 402 where the battery cells 110 disposed on the cooling plate 402 are relatively hot and the cooling plate 102 draws the heat away from the battery cells 110.

FIG. 6A is an example illustration of a battery cooling system 500 according to another example of the present disclosure. According to the example, a first group of battery cells 110 are disposed on a first surface 514 and a second group of battery cells 112 are disposed on a second surface 516 of the cooling plate 502. The cooling plate 502 is configured to be a heat exchanger for the battery cells 110, 112 so that it draws the heat away from the battery cells 110, 112. In some examples, the cooling plate 502 is coupled to a first side wall heat exchanger 504 and a second side wall heat exchanger 506, thus forming a thermally conductive frame. The first side wall heat exchanger 504 is coupled to the cooling plate 502 along a first edge of the cooling plate 502 and the second side wall heat exchanger 506 is coupled to the cooling plate 502 along a second edge of the cooling plate 502. The cooling plate 502 may be made of a thermally conductive material such as aluminum or other thermally conductive metal and the first and second side walls 504, 506 may include a plurality of heat sink fins 602, such as the ones illustrated in FIG. 5. Thus, the cooling plate 502 is configured to draw heat from the first and second groups of battery cells 110, 112 from both surfaces 514, 516 of the cooling plate 502, and the heat from the cooling plate 502 is drawn toward the first and second side wall heat exchangers 504, 506 where the heat is dissipated through the fins 602, as indicated by the arrows.

FIG. 6B illustrates a thermal gradient of the cooling plate 502 and the first and second side wall heat exchangers 504, 506, according to the example illustrated in FIG. 6A. As illustrated, the thermal gradient shows that both surfaces of the cooling plate 502 are warmer than the center portion of the cooling plate 502 because the cooling plate 502 draws the heat from the battery cells 110, 112 through both the first surface and the second surface 514, 516 of the cooling plate 102. Subsequently, the heat from the cooling plate 502 is drawn toward the first and second side wall heat exchangers 504, 506.

In some examples, the heat may be dissipated into the air through natural air circulation. In other examples, an external source such as a fan may be used to increase the air circulation to dissipate the heat faster through the fins. Yet in some examples, the battery cooling system 500 may be disposed in a compartment of a vehicle in such a way that the fins 602 of the first and second side walls 504, 506 are exposed from the compartment (e.g., battery pod 600) to the environment as illustrated in FIG. 7. For example, by disposing the battery cooling system 500 in an aircraft compartment or a battery pod 600 of an aircraft and the fins 602 are exposed to the exterior through an opening such as a port hole, high velocity air flow as a result of the aircraft flying can improving the heat dissipation capabilities of the fins 602.

FIG. 8A is an example battery cooling system 700 similar to that illustrated in FIG. 6A with an additional thermally conductive first cover 702 and a thermally conductive second cover 704, both coupled to the first and second sidewall heat exchangers 504, 506. In various examples, the first and second covers 702, 704 may be made of the same material as the cooling plate 502 and may be configured to draw heat from the battery cells 110, 112. Thus, according to this arrangement, the heat from the battery cells 110, 112 may be directly drawn to the cooling plate 502, the first cover 702, and the second cover 704, and the first and second wide wall heat exchangers 504, 506 may then draw the heat from the cooling plate 502, the first cover 702, and the second cover 704, where it is dissipated. In some examples, a thermally conductive interstitial layer may be disposed between each of the battery cells 110, 112 and a corresponding first or second cover 702, 704 in addition to the cooling plate 502.

FIG. 8B illustrates a thermal gradient of the cooling plate 502, the first and second side wall heat exchangers 504, 506, and the first and second covers 702, 704, according to the example illustrated in FIG. 8A. As illustrated, the thermal gradient shows that both surfaces of the cooling plate 502 and the interior surface of the first and second covers 702, 704 are the warmest because they are drawing the heat directly (or through the thermally conductive interstitial layer) from the battery cells 110, 112 and the heat is then drawn toward the first and second side wall heat exchangers 504, 506 where it is dissipated through the fins 602.

Figure 9:
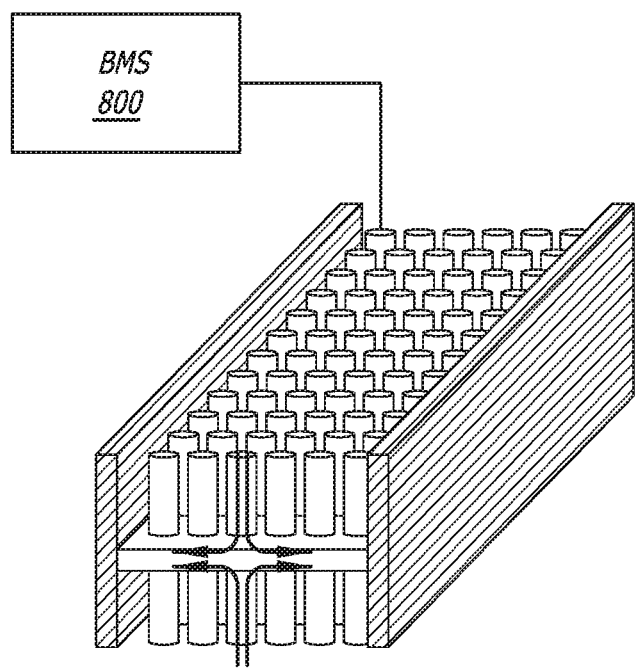
FIG. 9 is an example illustration of a battery cooling system coupled to external devices, according to an example of the present disclosure.

FIG. 9 illustrates an example battery cooling system that is coupled to external devices. For example, various wiring interconnections can be coupled between the battery cells and other electrical circuitry and devices, such as a battery monitoring system (BMS) 800. In some examples, a BMS may be used to monitor the status of the battery and its related components including, but not limited to battery voltage and charge level, temperature of the individual battery cells, and/or temperature of the battery compartment.

FIGS. 10A-10D illustrate example configurations of the thermally conductive interstitial layer 108 based on the arrangement of the battery cells 110, 112, according to various examples of the present disclosure. In some examples, the interstitial layer 108 may be a layer that is disposed merely between the battery cell 110 and the cooling plate 102 to form a thermal coupling or contact. Yet in other examples, the interstitial layer 108 may be disposed between the battery cell 110 and the cooling plate 102, and additionally, along the sides surfaces of the battery cell 110 thereby increasing the thermal coupling between the battery cell 110 and the interstitial layer 108. For example, the interstitial layer 108 may be coupled along an entire length (or substantially an entire length) of the battery cell 110, thereby increasing the surface area in which the interstitial layer 108 comes in contact with the battery cell 110. Thus, more heat may be removed from the battery cells 110 because more surface area of the battery cell 110 is in contact with the interstitial layer.

Figure 10A:
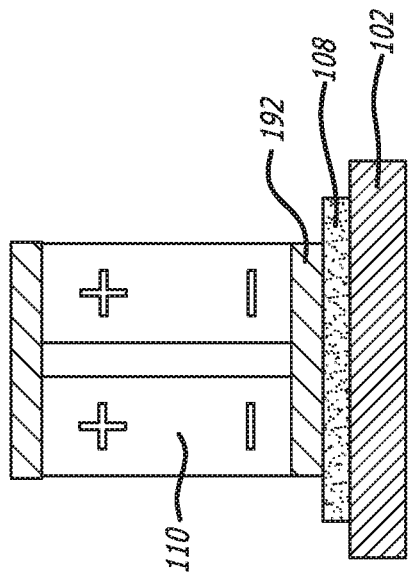
FIGS. 10A-10D illustrate example configurations of the thermally conductive interstitial layer 108 based on the arrangement of the battery cells 110, 112, according to various examples of the present disclosure.
Figure 10B:
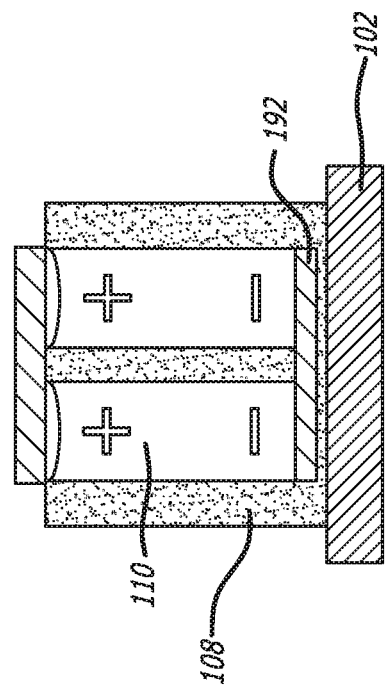
Figure 10C:
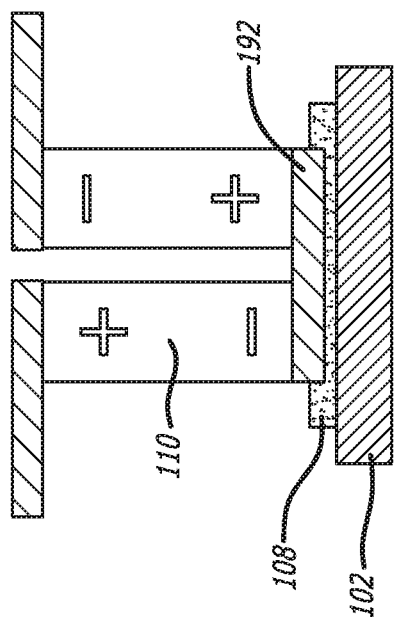

FIG. 10A illustrates a close-up view of a configuration where two battery cells are electrically coupled in series with each other. A lower electrode 192 couples a negative end of one battery cell to a positive end of another battery cell, and the interstitial layer 108 is disposed between the lower electrode 192 and the cooling plate 102 to convey or promote heat transfer from the battery cells 110 to the cooling plate 102. Similarly, in an arrangement where the battery cells 110 are electrically coupled in parallel with each other as illustrated in FIG. 10B, the interstitial layer 108 may also be disposed between the lower electrode 192 and the cooling plate 102. FIG. 10C illustrates an alternative example where the interstitial layer 108 is disposed, in addition to between the lower electrode 192 and the cooling plate 102, along the entire length (or substantially an entire length) of the battery cells 110, including between the battery cells to increase the surface area of the battery cells 110 that come in contact with the interstitial layer 108, thus increasing heat transfer from the battery cells 110 to the cooling plate 102.

Figure 10D:
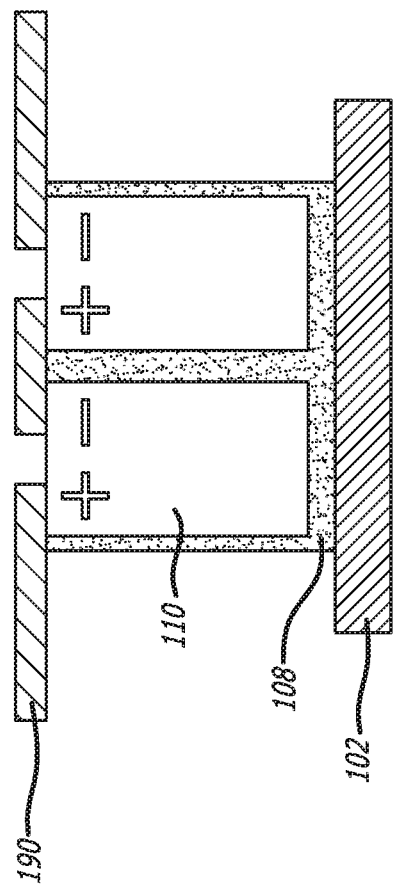

FIG. 10D illustrates an example where both the positive and negative terminals of the battery cells 110 are located on the same end of the batteries (e.g., the top end). In such case, the electrodes 192 are all located at the top of the battery cells 110 and the interstitial layer 108 109 is disposed between the battery cells 110 along the entire length (or substantially an entire length) of each battery cell and between the bottom of the battery cells 110 and the cooling plate 102. Thus, as illustrated in FIGS. 10A-10D, various configurations and arrangements of the interstitial layer 108 are possible to increase thermal contact between the battery cells 110 and the cooling plate 102.

Figure 11:
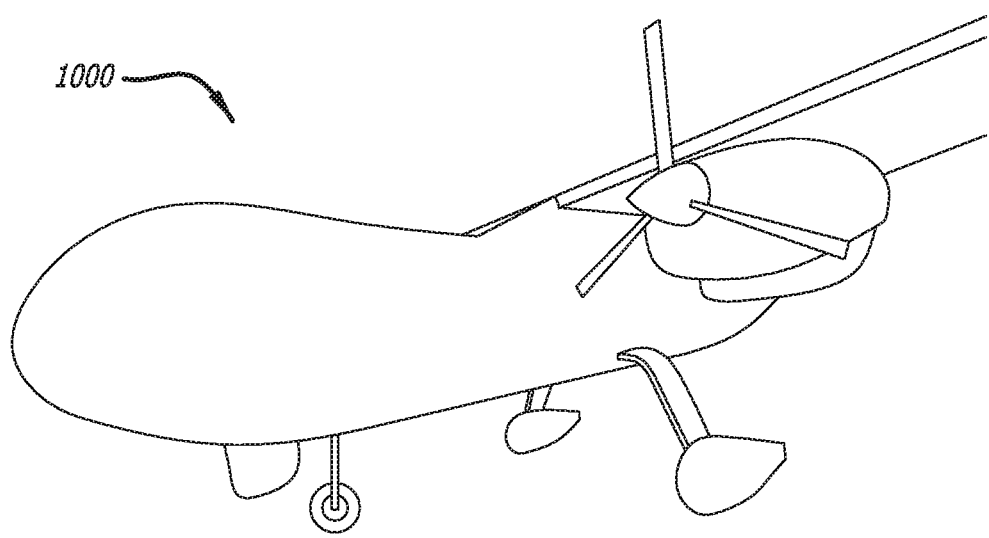
FIG. 11 is an illustration of an example aircraft implementing the battery cooling system, according to various examples of the present disclosure.

FIG. 11 is an illustration of an example aircraft 1000 implementing the battery cooling system, according to various examples of the present disclosure. The aircraft 1000 may be an unmanned aerial vehicle (UAV) that is configured to be powered by rechargeable batteries. In some examples, in order to remove heat generated by the batteries during operation or during battery charging, various examples of the battery cooling system may be implemented. For example, the battery cells may be stowed in a battery stowage pod or a compartment in the fuselage of the aircraft. In some examples, the pod may have an opening 804 such as that illustrated in FIG. 7 to expose the heat sink fins 602 to an exterior of the aircraft from the opening 804 so that ambient air may dissipate the heat from the fins 602. For example, the sidewalls 504, 506 (in FIG. 6A) including the fins 602 may form a part of the exterior surface of the aircraft. In this manner, the fins 602 will be exposed to the exterior of the aircraft and when the aircraft flies, the high velocity air generated by the flying aircraft will increase heat dissipation from the battery cells.

Figure 12:
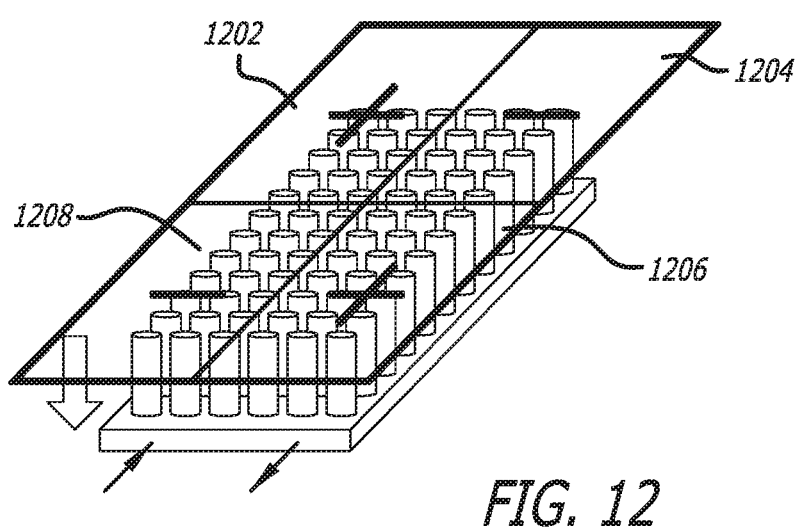
FIG. 12 is an illustration of an example arrangement of the battery cell, according to an example of the present disclosure.

FIG. 12 is an illustration of an example arrangement of the battery cells 110 within a group, according to an example of the present disclosure. The battery cells 110 may be grouped into subgroups, for example, based on polarity. According to the example of FIG. 12, the battery cells 110 are divided into subgroups 1202, 1204, 1206, 1208. In one example, the battery cells within each subgroup are electrically coupled in parallel to increase the battery capacity. In this manner, one subgroup of battery cells may be electrically coupled to another subgroup of battery cells in series to increase the overall voltage provided by the battery cells. In another example, the battery cells within each subgroup are electrically coupled in series, thus resulting in a higher voltage, and the subgroups of the battery cell may be coupled to other subgroups in parallel to increase the overall capacity of the battery cells.

Figure 13:
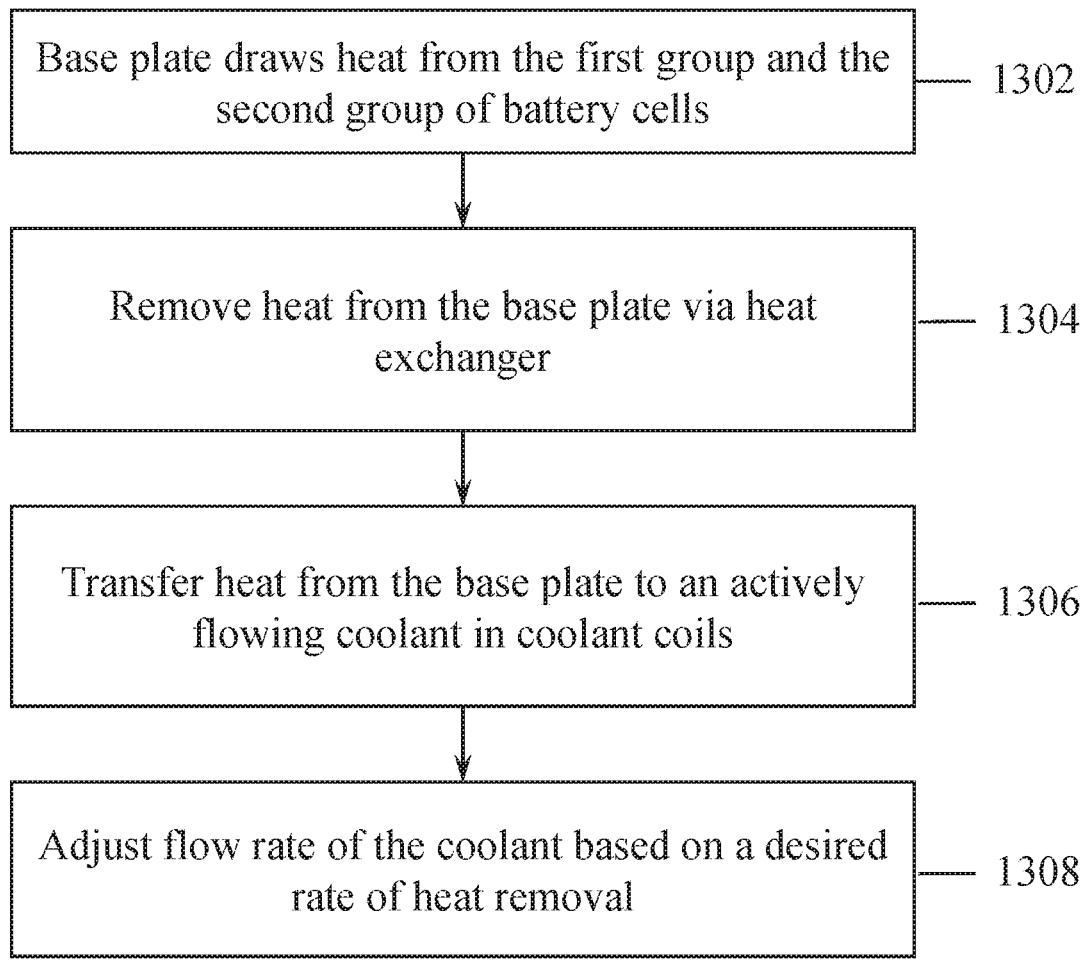
FIGS. 13-15 are flow charts illustrating methods for cooling a battery system, according to various examples of the present disclosure.

FIG. 13 is flow chart illustrating a method for cooling a battery system, according to an example of the present disclosure. According to the example, the cooling plate 102 may include a coolant cooled heat exchanger wherein a coolant pump may be used to actively flow the coolant through cooling coils embedded in the cooling plate 102 as illustrated in FIGS. 3A-3B. Accordingly, the cooling plate 102 may draw heat from the first group of battery cells 110 and the second group of battery cells 112 (1302). For example, the first group of battery cells 110 may be on the first surface 114 of the cooling plate 102 and the second group of battery cells 112 may be on the second surface 116 of the cooling plate 102, thereby providing two groups of battery cells on two surfaces of the cooling plate 102. The heat generated by the battery cells 110, 112 is removed through a heat exchanger of the cooling plate 102 (1304). In some examples, the heat exchanger may be a coolant cooled heat exchanger. Thus, the heat from the battery cells is transferred from the cooling plate 102 to an actively flowing coolant in the coolant coils, thereby removing the heat from the cooling plate 102 (1306). The flow rate of the coolant in the coolant coils may be adjusted based on a desired rate (e.g., a selected rate) of heat removal (1308). Thus, as the battery cells become hotter and more cooling is desired, the flow rate of the coolant may be increased.

Figure 14:
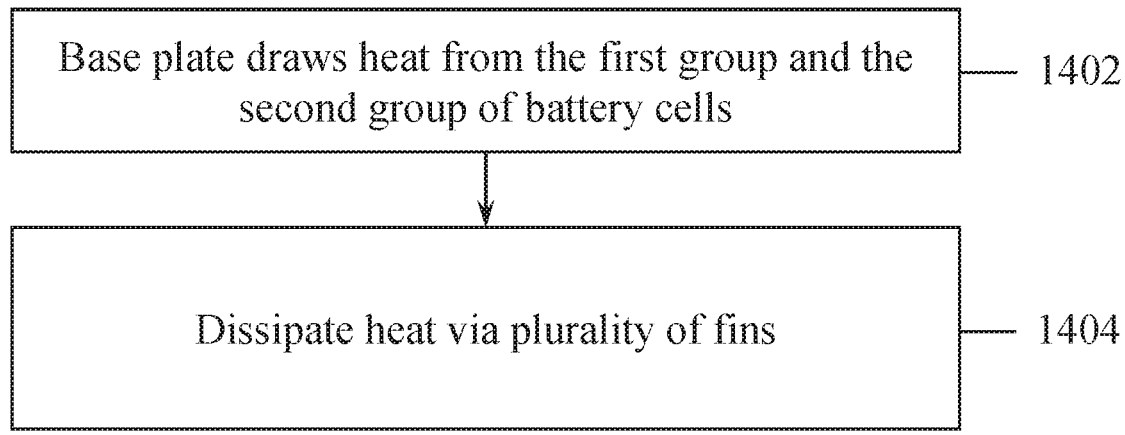

FIG. 14 is a flow chart illustrating a method for cooling a battery system according to an example of the present disclosure. According to the example, the cooling plate 502 may be coupled to heat sink fins to dissipate heat from the cooling plate 502. Accordingly, the cooling plate 502 may be configured to draw heat from the first and second groups of battery cells 110, 112 (1402). The heat that is drawn by the cooling plate 502 is then dissipated through the fins in to the environment (1404).

Figure 15:
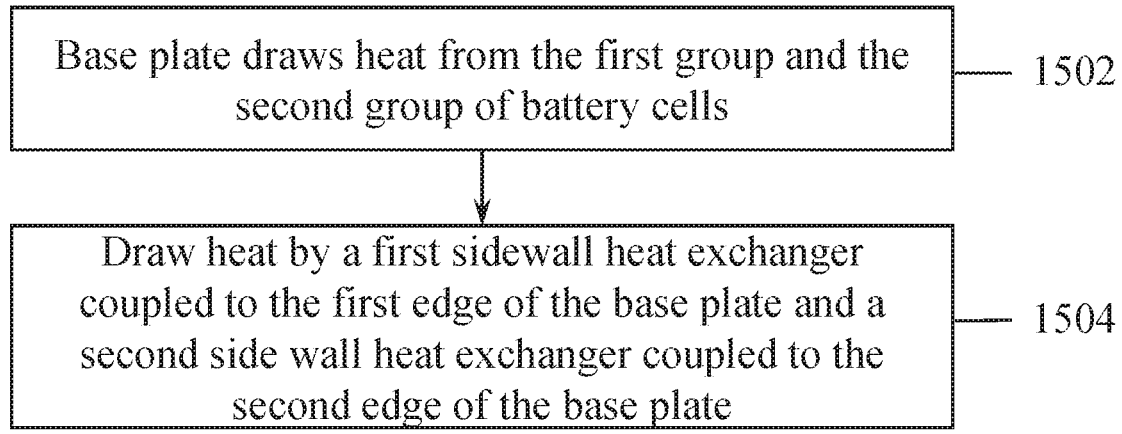

FIG. 15 is a flow chart illustrating a method for cooling a battery system according to an example of the present disclosure. According to the example, the cooling plate 502 may be coupled to a first sidewall heat exchanger 504 and a second sidewall heat exchanger 506 as illustrated in FIG. 6A. Accordingly, the cooling plate 502 may be configured to draw heat from the first and second groups of battery cells 110, 112 (1502). The heat that is drawn by the cooling plate 502 is then drawn by the first and second sidewalls 504, 506 coupled to the first and second edges of the cooling plate, respectively (1504).

As provided, the temperature of the battery cells may be reduced to avoid overheating of the battery cells by utilizing cooling plates and heat exchangers as described in various examples of the present disclosure. Further, by utilizing more available space or surface area of the cooling plates, a more efficient technique of cooling the battery cells may be achieved without adding additional weight.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Examples described herein are not intended to be limiting. One skilled in the art may recognize various alternative examples from those specifically disclosed. Those alternative examples are also intended to be within the scope of this disclosure. As such, the examples are limited only by the following claims and their equivalents.

The invention claimed is:

1. A battery system, comprising:
   a thermally conductive cooling plate comprising a first surface and a second surface opposite the first surface;
   a first group of battery cells disposed on the first surface of the cooling plate;
   a first electrode disposed between the first group of battery cells and the cooling plate, the first electrode coupling a positive or negative terminal of at least one battery cell of the first group of battery cells to a positive or negative terminal of at least one other battery cell of the first group of battery cells;
   a second group of battery cells disposed on the second surface of the cooling plate; and
   a thermally conductive interstitial layer coupled between the cooling plate and the first group of battery cells, and between the cooling plate and the second group of battery cells, the interstitial layer having a continuous part comprising a first portion disposed between the first surface and the first electrode and comprising a second portion extending away from the first surface along an entire length of each battery cell of the first group of battery cells, the second portion increasing a surface area of the first group of battery cells that come in contact with the thermally conductive interstitial layer;
   wherein the cooling plate is configured to draw heat from the first group and the second group of the battery cells.

2. The system of claim 1, further comprising a second electrode disposed between the second group of battery cells and the cooling plate, the second electrode coupling a positive or negative terminal of at least one battery cell of the second group of battery cells to a positive or negative terminal of at least one other battery cell of the second group of battery cells;
   wherein the cooling plate comprises a heat exchanger configured to remove the heat from the cooling plate generated by the first group and the second group of battery cells.

3. The system of claim 2, wherein the heat exchanger is a fluid cooled heat exchanger comprising coolant coils embedded within the cooling plate, wherein the coolant coils transfer the heat from the cooling plate to an actively flowing coolant in the coolant coils;
   wherein the heat exchanger makes a plurality of turns in approaching an edge of the cooling plate.

4. The system of claim 3, further comprising at least one mounting bracket formed by at least a part of the interstitial layer and configured to assist with mounting the battery cells to the cooling plate to prevent the battery cells from moving off of the cooling plate;
   wherein a flow rate of the coolant is configured to be adjusted based on a selected rate of heat removal.

5. The system of claim 2, wherein:
   the first surface comprises a first area which comprises an entire area covered by the first group of battery cells;
   the thermally conductive interstitial layer covers the first area; and
   the heat exchanger is a heat sink comprising a plurality of fins, wherein the plurality of fins are configured to dissipate the heat.

6. The system of claim 1, wherein the cooling plate further comprises:
   a first edge and a second edge opposite the first edge;
   a first side wall heat exchanger coupled to the first edge of the cooling plate;
   a second side wall heat exchanger coupled to the second edge of the cooling plate; and
   wherein the first and second side wall heat exchangers are configured to draw the heat from the cooling plate;
   wherein the first surface comprises a first area which comprises an entire area covered by the first group of battery cells;
   wherein the thermally conductive interstitial layer covers the first area and extends beyond the first area; and
   wherein the second portion is present between at least one pair of adjacent battery cells of the first group of battery cells.

7. The system of claim 6, where in the first and second side wall heat exchangers are heat sinks comprising a plurality of fins, wherein the plurality of fins are configured to dissipate the heat.

8. The system of claim 1, wherein;
   the first surface comprises a first area which comprises an entire area covered by the first group of battery cells;
   the thermally conductive interstitial layer covers the first area and extends over the first surface beyond the first group of battery cells; and
   the second portion extends along an entire length of each battery cell of the first group and second group of battery cells to increase thermal contact with each battery cell.

9. The system of claim 1, further comprising:
   a thermally conductive first cover coupled to the first group of battery cells and configured to draw the heat from the first group of battery cells; and
   a thermally conductive second cover coupled to the second group of the battery cells and configured to draw the heat from the second group of battery cells.

10. An aircraft comprising the system according to claim 7, wherein the system is disposed on the aircraft such that the first side wall heat exchanger and/or the second side wall heat exchanger form a part of an exterior surface of the aircraft.

11. The aircraft of claim 10, wherein the plurality of fins is exposed to an exterior to dissipate heat by air flowing over the plurality of fins.

12. The aircraft of claim 10, wherein the aircraft is an unmanned aerial vehicle (UAV) and the system is disposed in a battery pod of the UAV.

13. A method for cooling a battery system comprising:
a thermally conductive cooling plate comprising a heat exchanger, a first surface, and a second surface opposite the first surface;
a first group of battery cells disposed on the first surface of the cooling plate;
a first electrode disposed between the first group of battery cells and the cooling plate, the first electrode coupling a positive or negative terminal of at least one battery cell of the first group of battery cells to a positive or negative terminal of at least one other battery cell of the first group of battery cells:
a second group of battery cells disposed on the second surface of the cooling plate;
a thermally conductive interstitial layer coupled between the cooling plate and the first group of battery cells, and between the cooling plate and the second group of battery cells, the interstitial layer having a continuous part comprising a first portion disposed between the first surface and the first electrode and comprising a second portion extending away from the first surface along an entire length of each battery cell of the first group of battery cells, the second portion increasing a surface area of the first group of battery cells that come in contact with the thermally conductive interstitial layer;
wherein:
the first surface comprises a first area which comprises an entire area covered by the first group of battery cells;
the thermally conductive interstitial layer covers the first area; and
the method comprises:
drawing heat, by the cooling plate, from the first group and the second group of battery cells; and
removing, via the heat exchanger, the heat from the cooling plate.

14. The method of claim 13, wherein:
the thermally conductive interstitial layer extends over the first surface beyond the first group of battery cells;
the second portion is present between at least one pair of adjacent battery cells of the first group of battery cells; and
the heat exchanger is a fluid cooled heat exchanger comprising coolant coils embedded within the cooling plate, wherein the method further comprises transferring, via the coolant coils, the heat from the cooling plate to an actively flowing coolant in the coolant coils.

15. The method of claim 14, wherein the heat exchanger makes a plurality of turns in approaching an edge of the cooling plate, and the method further comprises adjusting a flow rate of the coolant based on a selected rate of heat removal.

16. The method of claim 13,
wherein the second portion extends along an entire length of each battery cell of the first group and second group of battery cells to increase thermal contact with each battery cell;
further comprising dissipating the heat, by a plurality of fins, wherein the heat exchanger is a heat sink comprising the plurality of fins.

17. The method of claim 13, further comprising drawing the heat by a first sidewall heat exchanger coupled to a first edge of the cooling plate and a second side wall heat exchanger coupled to a second edge of the cooling plate, wherein the first edge is opposite the second edge.

18. A battery cooling system, comprising:
a thermally conductive frame comprising a cooling plate, a first side wall, and a second side wall;
a first group of battery cells disposed on a first surface of the cooling plate;
a first electrode disposed between the first group of battery cells and the cooling plate, the first electrode coupling a positive or negative terminal of at least one battery cell of the first group of battery cells to a positive or negative terminal of at least one other battery cell of the first group of battery cells;
a second group of battery cells disposed on a second surface of the cooling plate opposite the first surface; and
a thermally conductive interstitial layer coupled between the first surface of the cooling plate and the first electrode, and between the second surface of the cooling plate and the second group of battery cells, the interstitial layer having a continuous part comprising a first portion disposed between the first surface and the first electrode and comprising a second portion extending away from the first surface along an entire length of each battery cell of the first group of battery cells, the second portion increasing a surface area of the first group of battery cells that come in contact with the thermally conductive interstitial layer;
wherein the cooling plate is configured to draw heat from the first group and the second group of the battery cells and transfer the drawn heat to the first and second side walls configured to dissipate the heat into air.

19. The system of claim 18,
wherein the second portion is present between at least one pair of adjacent battery cells of the first group of battery cells;
wherein the first and second groups of battery cells further comprise a plurality of subgroups of battery cell,
wherein each battery cells within a subgroup of battery cells are electrically coupled in parallel with each other, and
wherein the subgroup of battery cells are electrically coupled in series with other subgroups of battery cells.

20. The system of claim 18,
wherein the second portion extends along an entire length of each battery cell of the first group and second group of battery cells to increase thermal contact with each battery cell;
wherein the first and second groups of battery cells further comprise a plurality of subgroups of battery cell,
wherein each battery cells within a subgroup of battery cells are electrically coupled in series with each other, and
wherein the subgroup of battery cells are electrically coupled in parallel with other subgroups of battery cells.

* * * * *